J. K. CALDWELL.
MACHINE FOR MAKING AND PRESSING BRICK.

No. 192,226. Patented June 19, 1877.

3 Sheets—Sheet 1.

Witnesses
Saml. J. VanStavoren
Jos. B. Connolly

Inventor
John K. Caldwell
By Connolly Bros.
Attorneys

N. PETERS, PHOTO-LITHOGRAPHER, WASHINGTON, D.C.

J. K. CALDWELL.
MACHINE FOR MAKING AND PRESSING BRICK.

No. 192,226. Patented June 19, 1877.

3 Sheets—Sheet 2.

Witnesses
Saml. J. Van Stavoren
Jos. B. Connolly

Inventor
John K. Caldwell
By Connolly Bros., Attorneys

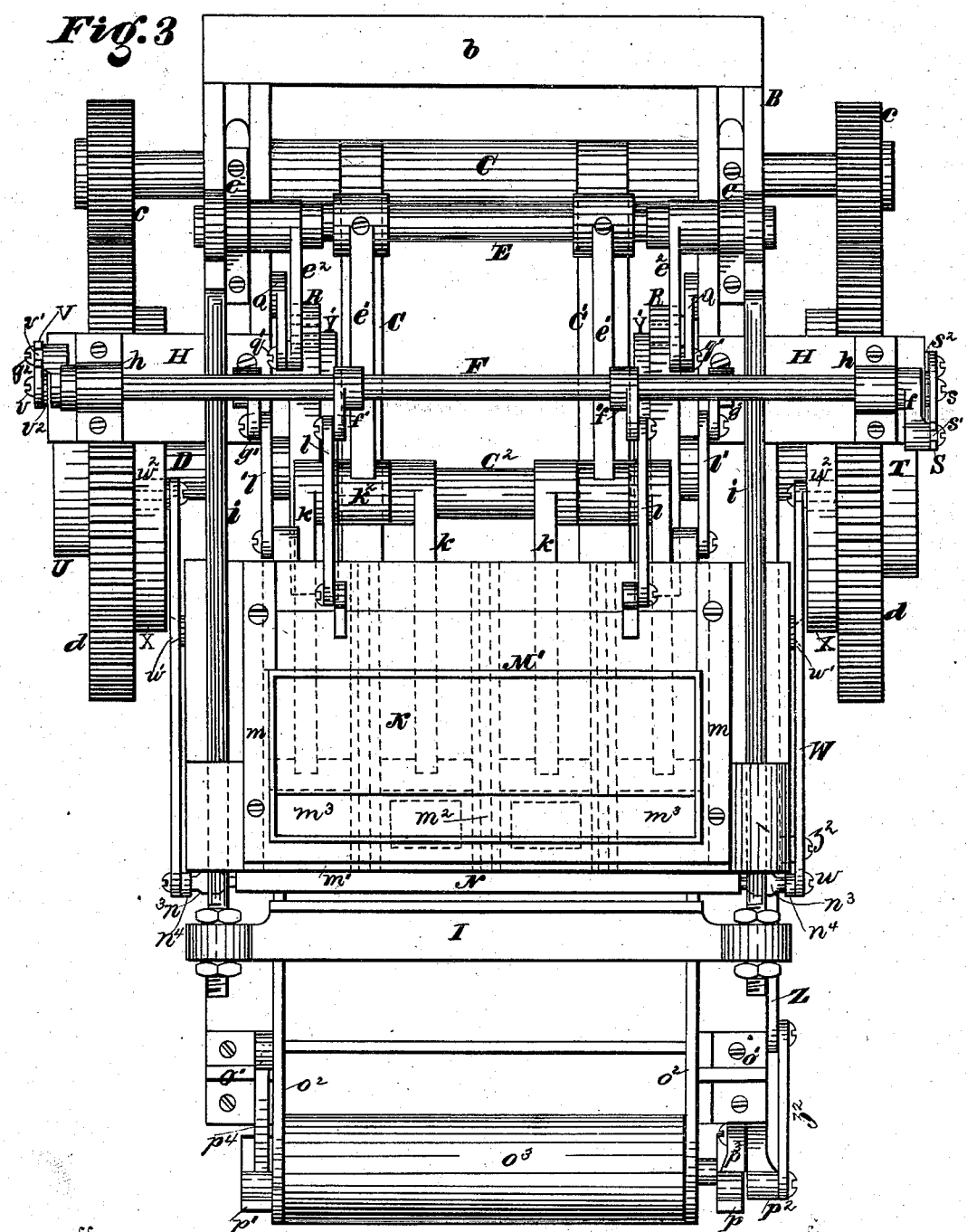

UNITED STATES PATENT OFFICE.

JOHN K. CALDWELL, OF PHILADELPHIA, PENNSYLVANIA.

IMPROVEMENT IN MACHINES FOR MAKING AND PRESSING BRICKS.

Specification forming part of Letters Patent No. 192,226, dated June 19, 1877; application filed November 8, 1876.

*To all whom it may concern:*

Be it known that I, JNO. K. CALDWELL, of Philadelphia, in the county of Philadelphia and State of Pennsylvania, have invented a certain new and useful Machine for Making and Pressing Bricks and other articles; and I do hereby declare the following to be a full, clear, and exact description of the invention, such as will enable others skilled in the art to which it pertains to make and use it, reference being had to the accompanying drawings, which form part of this specification, in which—

Figure 1:
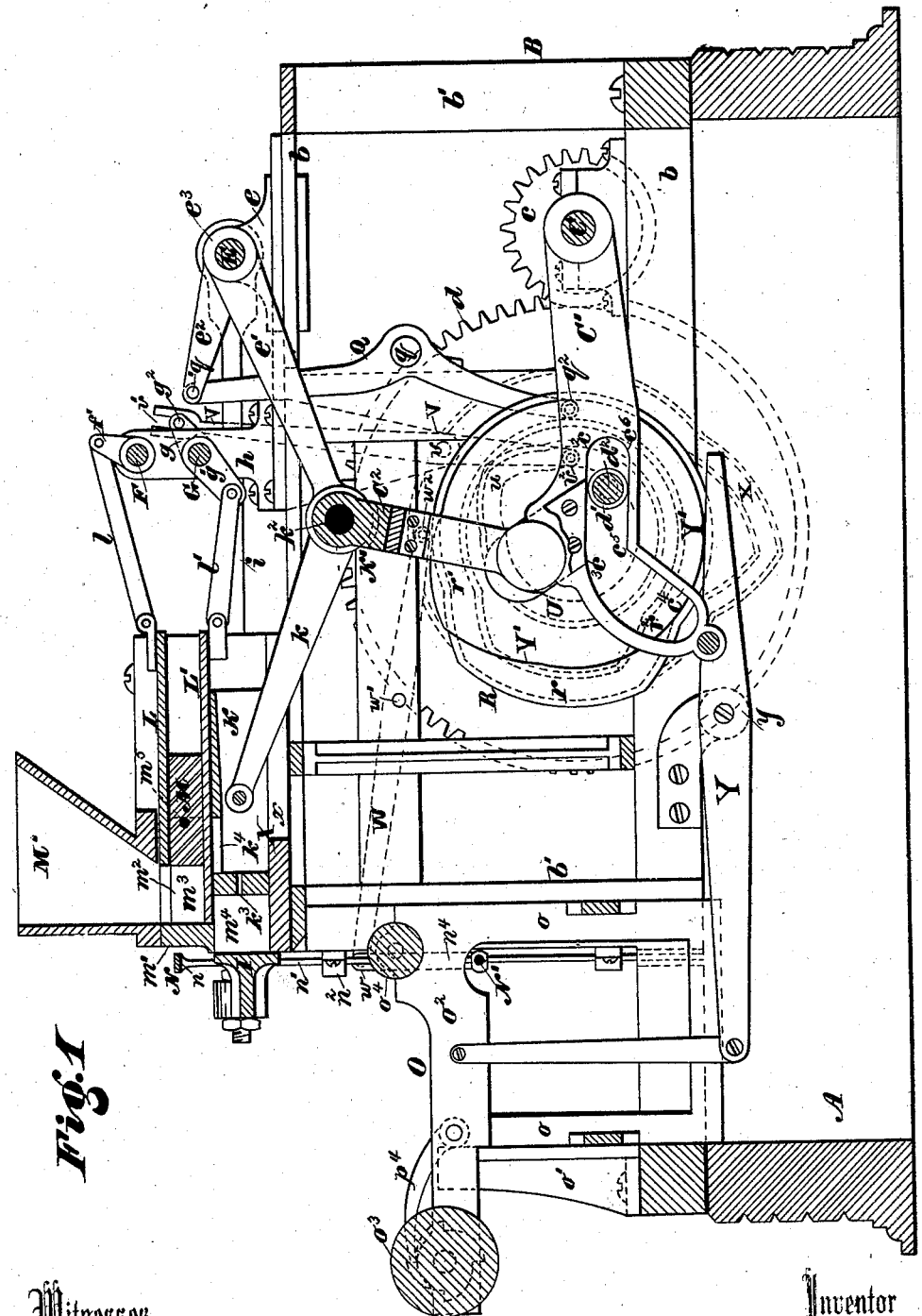
Figure 2:
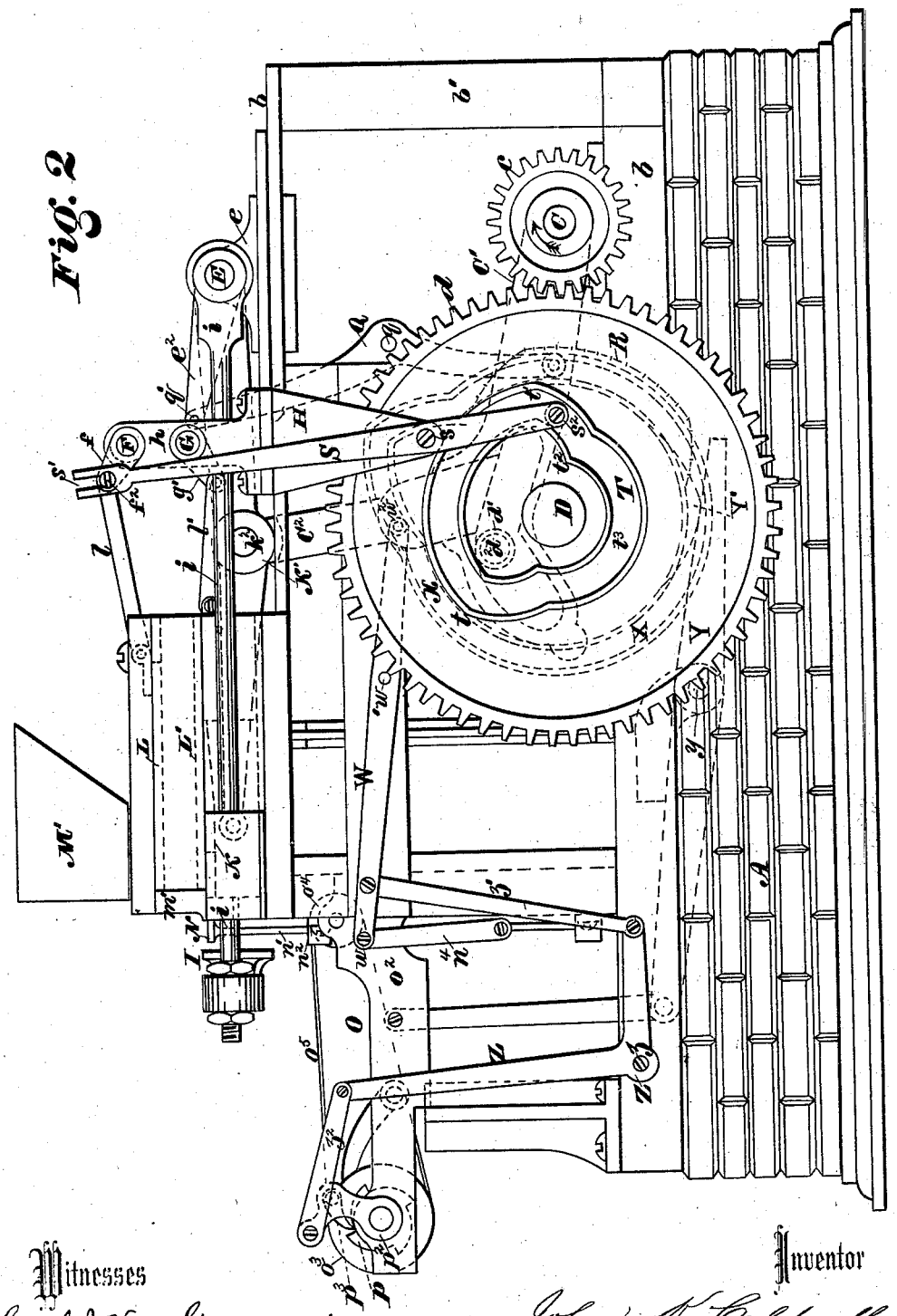

Figure 1 is a longitudinal vertical section. Fig. 2 is a side elevation, and Fig. 3 is a plan of my invention.

My invention consists in the peculiar construction, combination, and arrangement of parts, hereinafter more fully set forth, having reference particularly to the following points: First, to the employment of a toggle or toggles for the purpose of obtaining greater power in pushing the plungers forward or toward the platen, said toggle or toggles having a movable fulcrum or fulcra; second, to connecting the platen to a shaft against which the plunger-toggle is opened, so that said platen will be held up to or against the push of the plungers by a power equal to that by which said plungers are advanced; third, to so constructing the plungers that any clay which may work into the interstices between the top of the same and the lower cut-off slide will be dropped to prevent its being returned to the mold on the forward motion of the plunger; fourth, to the employment of slides working, respectively, above and below the measuring boxes or chambers, and operating to cut off the precise quantity of clay required to fill the molds, the lower one of said slides forming the bottom of said measuring-boxes and a part of the top of said molds; fifth, to the provision of a wiper for cleaning the faces of the plungers and platen and the edges of the division plates or boards, said wiper reciprocating vertically between the platen and plungers, and operating to dislodge bricks which may become fast between said parts; sixth, to the provision of a table which has a vertical reciprocating motion, rising to receive the bricks as they are ejected from the molds, and sinking with said bricks after they are laid upon it, said table having an endless apron or traveling band, to which an intermittent motion is communicated when the frame on which it is supported has sunk to its lowest position; seventh, to the peculiar construction, combination, and arrangement of cams, cranks, levers, and pawls for operating the plungers, slides, platen, wiper, and table, as hereinafter more fully set forth.

Referring to the accompanying drawings, A designates a mason-work foundation, on which the machine is supported, and B the frame of said machine, consisting, essentially, of the sills $b\ b$ and uprights $b'\ b'$. C is the driving-shaft, resting in bearings on the sill-pieces, and provided with pinions $c\ c$, which mesh with gear-wheels $d\ d$ made fast on the end of a crank-shaft, D, which is also fitted in bearings fast on the lower sills $b\ b$. E is another shaft, arranged transversely of the machine, its bearings or boxes $e\ e$ resting in grooves or ways formed in the upper sills $b\ b$, so as to permit said shaft to be moved to and fro on the machine. F and G are rock-shafts, sustained in arbors $h\ h$ made fast to brackets H H, which are supported on the upper sills $b\ b$, and project outwardly from the sides of the machine over the gear-wheels $d\ d$. Each of the shafts F G has a crank-arm, $f\ g$, respectively on opposite sides of the machine, and intermediate cranks or shouldered collars $f^1\ g^1$.

I is the platen, connected with the shaft E by rods $i\ i$, and K K are the plungers, connecting also with said shaft E by means of arms or levers $k\ k$, articulated on a shaft or pin, $k^2$, to form a toggle or toggles, K', the arms $k$ having a pivotal connection with cranks $e^1$ or equivalent rock-arms, projecting from collars firmly fastened on said shaft E.

L L' are, respectively, the upper and lower slides, working on opposite sides of a diaphragm, M, which is so fitted between sides $m\ m$ as to leave an open space between it and the bar or side $m^1$, said opening and the chamber beneath being divided vertically by boards or plates $m^2$, to form measuring-boxes $m^3$ and molds $m^4$. Said slides are connected by pivoted levers $l\ l'$ to the collars or rock-arms $f^1\ g^1$ on the shafts F G, so that when said shafts are rocked the slides will be alternately reciprocated in and out beneath the hopper M'.

N represents the wiper, consisting of a transverse bar, $n$, which is intended to be provided with rubber or equivalent shoes or fringes to form cleaners, sustained on posts $n^1 n^1$, which are caused to slide vertically in bearings $n^2$, secured to the forward posts of the machine.

O is the receiving-table, consisting of uprights $o o$, which move vertically in guides on the posts $b' b'$ and arbors $o^1 o^1$, said uprights supporting bars $o^2 o^2$, at the opposite extremities of which are sustained rollers $o^3 o^4$, around which an endless apron or band, $o^5$, travels. Between said rollers $o^3 o^4$ other rollers (not shown in the drawings) are designed to be placed, to support the traveling band $o^5$ and prevent its sagging when loaded. The ends of the shaft of the roller $o^3$ are provided with ratchets $p p^1$, a loose crank-arm, $p^2$, on which is pivoted a pawl, $p^3$, engaging with the ratchet $p$, being swiveled on one end of said shaft, while a pawl, $p^4$, pivoted on the opposite side of the table on one of the bars $o^2$, engages with the ratchet $p^1$.

$C' C'$ are arms, which swing loosely on the driving-shaft C, their forward extremities or heads being cut to form cam grooves or slots, in which move anti-friction rollers $d^1 d^1$, sustained on the cranks $d^2 d^2$ of the shaft D. These slots or grooves are straight from $c^2$ to $c^3$. From $c^3$ to $c^4$ on their upper side they are curved, being struck from the same center, and having the same radius as the cranks $d^2 d^2$. From $c^4$ to $c^5$ they are straight.

The effect of this peculiar formation of said slots or grooves is that when crank-rollers $d^2$ are moving from $c^3$ to $c^4$, rolling against the upper or curved side, the position of the arms $C^1$ will be undisturbed. When said rollers move from $c^4$ to $c^5$ the arms will be drawn down, (collapsing the toggle K',) and when moving from $c^5$ to $c^6$, and from the latter point back to $c^3$, said arms will be elevated, opening or distending the toggle K' and advancing the plungers K. By making the slot straight from $c^4$ to $c^5$ a tendency toward a horizontal or backward movement of the arms $C^1$, which would be produced if said part of the slot were curved, is avoided. $C^2$ is a yoke or pitman connecting the arms $C^1$ with the toggle-pin $k^2$, having a pivotal connection at both ends.

The elevation of the arms $C^1$ causes the toggle K' to be opened or distended, and the plungers K K to be moved forwardly toward the platen I. The depression of said arms causes the toggle to collapse or close, and the plungers to be withdrawn from the molds to permit the latter to receive a fresh charge of clay.

Between the opening and closing of the toggle, and without disturbing the distended condition of the latter, it is desirable to have the plungers advance far enough to cause the bricks to be ejected from the molds, the platen being moved correspondingly to permit such ejection. This is accomplished by the following means: Q Q represent levers, pivoted at $q q$ to the sides of the machine, having pivotal connections at $q^1$ with arms $e^2$, which project from collars $e^3$ loosely surrounding the shaft E, and bearing at their opposite extremities anti-friction rollers $q^2$, which move in cam-grooves $r$ on the outer faces of disks R fitted on the shaft D. Said grooves are nearly true circles, being segmental by the longest way around from $r^1$ to $r^2$, so that while the toggles K' are opening, the levers Q will be undisturbed. As soon, however, as said toggles have fully opened and passed slightly beyond their dead-center, the friction-rollers $q^2$ meet the cam-shoulders $r^1$, causing said levers Q to rock on their pivots and the shaft E (which follows the upward extremities of said levers) to move forwardly. This causes the plungers K to advance until their faces are flush with the front edges of the division-plates $m^2$, the bricks being thereby ejected from the molds. As the plungers K advance with this movement of the shaft E the platen I, which is connected with the latter by the rods $i i$, recedes correspondingly. Now, if the distance between the platen and the plungers were only that which existed when the toggle K' was at its dead-center, the bricks, when ejected from the molds, would still be held as in a vise between said platen and plungers.

To enlarge this distance the motion of the arms $C^1$ should be so regulated that the toggle K', after opening or distending to its fullest limit, will pass beyond its dead-center, thereby slightly withdrawing the plungers K. The forward motion of the shaft E then takes place, and when the bricks are pushed straight out from the mold, as described, they will drop down upon the table O, or be easily dislodged from between the platen and plungers by the wiper N.

The rock-shafts F and G are operated as follows: S is a lever, pivoted at $s$ on the bracket H, having at its upper end a slot, $s^1$, which receives a wrist-pin, $f^2$, on the crank $f$, its opposite extremity having an anti-friction roller, $s^2$, which moves in a cam-groove, T, formed on the outer face of one of the gear-wheels $d$. About one-half of this groove—namely, from $t$ to $t^1$ by the longest way around—is a segment of a circle, having for its center the shaft D. When the roller $s^2$ is moving through said segment the lever S remains unmoved. As soon, however, as said roller meets and rides the cam between $t^1$ and $t^2$, the lever swings on its pivot, its upper extremity being moved forwardly, causing the shaft F to rock in such manner as to throw forward the cranks or shoulders $f^1$ and cause the upper slide L to be pushed in sufficiently to cover the measuring-boxes $m^3$, cutting off the clay in the latter from that in the hopper M' above. The roller $s^2$ now rides the segment $t^3$, which is concentric with the segment lying between $t$ and $t^1$, the lever S then remaining stationary and the slide L dwelling in its "in" position. As soon as the roller $s^2$ meets the cam portion between $t^3$ and $t$ the movement of the lever S is reversed and the slide L caused to move outwardly, uncovering the measuring-boxes, into which clay from the hopper M' now falls.

As soon as the slide L has covered the measuring-boxes the slide L' is withdrawn, allowing the clay in said boxes to drop down into the molds beneath. The slide L' now advances, covering the molds, and the plungers K K then come into operation, compressing the clay against the platen I, the forward motion of said plungers being continued until the clay is compressed into the space directly beneath the bar or beam $m^1$, the faces of said plungers being then in the same vertical line with the back side of said bar $m^1$. The plungers K are then slightly drawn back, as already described, by the toggle K' passing beyond its dead-center.

The motion of the slide L' is accomplished substantially in the same way as that just described for the slide L, viz., by means of a lever, V, pivoted at $v$, and having a notch, $v'$, for the reception of the wrist-pin $g^2$ and anti-friction roller $r^2$. There is this difference, however, there is no "dwell" of the slide L' while out, as its forward motion immediately follows its withdrawal, and, when in, it remains stationary longer than the slide L does in like circumstances, the latter remaining in only long enough to permit the lower slide to withdraw and immediately return. This difference results from the fact that the groove U, in which the friction-roller $r^2$ moves, is, for about seven-eighths of its distance, the segment of a circle having for its center the shaft D, cam-shoulder $u$ having no segment corresponding to that of the segment $t^3$ in the groove T.

The wiper N is operated by the following means: A cross-bar, N', having projecting arms $n^3$ $n^3$, is rigidly attached to the posts $n^1$ $n^1$. From said arms or extensions $n^3$ project upwardly standards $n^4$ $n^4$, which have a pivoted connection at $w$ with levers W, which are pivoted on the sides of the machine at $w'$ $w'$, and sustain anti-friction rollers $w^2$, moving in cam-grooves X formed on the inner faces of the gear-wheels $d$. Said cam-grooves, when the shaft D is rotated, cause the levers W to rock on their pivots, their forward extremities rising and falling and producing an alternate up-and-down motion of the wiper N. This motion is so timed that while the platen I is drawn away from the molds the wiper swiftly descends, pushing down the bricks onto the table O, and immediately reascends, wiping the faces of the platen and plungers and the edges of the dividing-plates on both its downward and upward motion.

The table O is caused to ascend to receive the bricks when pushed down by the plunger, and to descend with its charge, its elevation and depression being produced by means of levers Y, pivoted at $y$, and operated by means of cams Y' on the shaft D.

The apron which travels over the rollers $o^3$ $o^4$ has an intermittent forward motion communicated to it through the instrumentality of the bell-crank lever Z, pivoted at $z$, and connected to the lever W and crank $p^2$, respectively, by the pitmen, $z^1$ $z^2$.

When the table O is up, and while ascending and descending, the band on the rollers $o^3$ $o^4$ does not travel thereon. As soon, however, as said table is depressed to its lowest plane, a quarter (or other fractional) revolution is given to the roller $o^3$ through the means described, causing said bands to travel far enough to allow the course of bricks last laid on it to clear the platen when the table next ascends.

The conjoint operation of the parts is substantially as follows: The hopper M' being filled with clay and the shaft C caused to rotate in the direction of its arrow, the shaft D is revolved in the opposite direction and the slide L withdrawn from under the hopper, allowing clay from the latter to enter and fill the measuring-boxes $m^3$, such clay then resting on the lower slide L' which then forms the bottom of said boxes. The slide L remains out amply long enough for the measuring-boxes $m^3$ to become filled with clay, which done, said slide is moved in, cutting off communication with the hopper and coming to a state of rest. The lower slide L' is immediately withdrawn, then allowing the clay to drop out of the measuring-boxes into the molds, said slide at once returning to its former position, forming part of the top of said molds. As soon as the lower slide has been fully pushed in, the upper slide is again withdrawn, as already described. Thus it will be seen that the upper slide remains in only while the lower slide is withdrawn to allow the clay in the measuring-boxes to drop into the molds $m^4$, and that the lower slide remains out only long enough to permit the emptying of said boxes, each slide, however, coming to a state of rest before the other begins to move. As soon as the lower slide is in and covers the molds the plungers K K advance against the clay in the latter, pressing the same toward the platen, which is then flush with the forward edge of the division-board $m^2$. The forward motion of the plungers, as already stated, is accomplished by the distension or opening of the toggle K', the pressure of said toggle being exerted equally against the shaft E, and therefore against the platen I, which is held to said shaft by the rods $i$ $i$. After the toggle has opened or become fully distended (by which time the clay in the molds has been compressed to the required extent) and passed slightly beyond its dead center, so as to partially withdraw the plungers from the molds, and thus increase the distance of the former from the platen, the shaft E is forwarded by the means already described, pushing the platen I away from the front side of the molds and advancing the plungers correspondingly, thereby ejecting the bricks from the molds. The table O has been already elevated by the means specified, so that its upper surface is now on a line a trifle below that of the bottom of the molds. The wiper N now descends, dislodging such bricks as are retained between the plungers and platen, if any, wiping the face of the latter and the edges of the division-plates, and immediately ascends, rewiping the same parts on its upward motion.

As the wiper N descends the table O, which has received the course of bricks ejected from the molds, goes down simultaneously. When the descent of the table is finished the apron $o^5$ is moved by the means specified, so as to advance the course of bricks just received sufficiently far forward to clear the platen I, when the table again ascends.

The object of having the table ascend is to avoid having the bricks fall any considerable distance to it, as such a fall would be likely to injure their edges or corners. The bricks being received on the table edgewise, it is necessary to have said table drop far enough to permit the former to clear the platen when the band $o^5$ moves forwardly with them.

To provide against any excess of clay in the mold, the plungers K may be formed with exit-orifices $k^3$, and, to prevent any clay which may work back over the top of said plungers from being returned to the molds, said plungers may be recessed to form chambers $k^4$, the clay dropping from such chambers through opening $x$ formed in the bottom X, when the plungers make their back stroke.

Under some circumstances the slides L L' may be dispensed with, and the clay permitted to drop directly from the bank, or from the hopper $m^1$, without any preliminary measuring or cutting off into the molds, there to be acted upon by the plungers, the clay above acting as a tamp for that in the molds. In such cases the plungers K should be made solid, or without chambers $k^4$.

The cubical area of the measuring-boxes (and also of the molds when the plungers are out) should be about double that of the brick to be formed, such area to be varied within the skill and judgment of the brick-maker, according to the density or quality of the clay being worked.

In making bricks from clay I prefer to use the latter in a granular or pulverized condition, having sufficient moisture to give adhesion to the particles after compression is finished.

If desired, the platen I may be formed with blocks or pieces to enter the molds and act as followers, instead of having its face perfectly plain and flush with the outer edges of the division-plates, thereby avoiding any possibility of feather-edges on the bricks.

This machine may be used not only for making bricks directly from loose clay, as described, but also for re-pressing imperfect hand-made bricks, or bricks of the same character from other less effective machines. In such cases it would probably be desirable to remove the hopper and slides, (or at least the hopper and upper slides,) the bricks to be re-pressed being fed by hand into the molds. The machine may be also advantageously employed in making artificial-fuel blocks, and for other purposes to which its construction will be found adapted, besides pressing or making and re pressing bricks.

The diaphragm M is fitted in grooves in the sides $m$, in order that it may be slid back and forth to increase or diminish the space between it and the beam $m^1$, and thereby to adjust the size of the measuring-boxes and regulate or vary the quantity of clay admitted to the molds. When adjusted, said diaphragm is held fast in position by a screw, $m^5$, or equivalent retaining device.

What I claim as my invention is—

1. In a machine for making or pressing bricks or other articles, and in combination with the plunger or plungers thereof, a toggle or toggles having movable fulcra, for operating said plungers, substantially as set forth.

2. In combination with the measuring-boxes and molds of a machine for making or pressing bricks or other articles, cut-off slides L L', arranged and operating substantially as described, the lower slide forming the bottom of said measuring-boxes and part of the top of the molds, and both slides reciprocating alternately, as and for the purpose set forth.

3. In combination with the plunger-impelling device or toggle K', the platen I, connected with the former, substantially as described, so that said platen will be held up to or against the push of the plungers by the force or power by which the latter are advanced toward said platen.

4. In combination with the plungers K K, a toggle, K', arranged and operated, as described, to pass beyond its dead-center, so as to increase the distance between said plungers and the platen after compression, for the purpose specified.

5. A wiper, N, arranged and operated to reciprocate vertically between the platen and plungers, substantially as and for the purposes set forth.

6. In combination with crank-shaft D, the lever or levers $C^1$, having a cam slot or groove, and operating as set forth, to convert a rotary into a reciprocating motion.

7. In a machine for making or pressing bricks or other articles, a vertically-reciprocating receiving-table extending forward of the platen, and arranged and operated to be elevated to receive the contents of the molds, and to descend with each charge, substantially as set forth.

8. In a machine for making or pressing bricks or other articles, a table having a traveling-band on which the contents of the molds are received, said band having an intermittent forward motion in the direction of the length of the machine, substantially as described.

9. In a machine for making or pressing bricks or other articles, a receiving-table which rises and falls, as described, and is provided with a traveling band or apron having an intermittent forward motion in the direction of the length of the machine, substantially as described.

10. The combination of slides L L′, hopper $M^1$, measuring-boxes $m^3$, and molds $m^4$, substantially as shown and described.

11. The combination of plungers K K, slides L L′, measuring-boxes $m^3$, and molds $m^4$, arranged and operating substantially as shown and described.

12. In combination with the plungers K K and toggle K′, the cam-levers $C^1$, pitman $C^2$, and crank-shaft D, substantially as shown and described.

13. In combination with the rock-shafts F G and cut-off slides L L′, the pivoted levers S V and cams T U, arranged and operating substantially as shown and described.

14. In combination with the platen I and plungers K K, the shaft E, mounted in sliding or movable bearings, and connected with said platen and plungers, substantially as described, so as to move said parts simultaneously, to cause the bricks to be ejected from the molds, as set forth.

15. In combination with the sliding-shaft E, the loose collars $e^3$, rock-arms $e^2$, pivoted levers Q, and cams R, arranged and operated substantially as shown and described.

16. In combination with the vertically-moving table O, the levers Y, pivoted at $y$, and operated from the cams Y′, substantially as shown and described.

17. In combination with the table O, having rollers $o^3$ $o^4$ for the reception of a traveling band, $o^5$, the levers W Z, pitmen $z^1$ $z^2$, crank $p^2$, ratchets $p$ $p^1$, pawls $p^3$ $p^4$, and cam X, as set forth.

18. In combination with the wiper N, sustained on rods $n^1$, the levers W, standards or pitmen $n^4$, and cams X, substantially as shown and described.

19. Plungers K, recessed at $k^4$ to prevent clay which has worked over the tops of said plungers from being carried back into the molds, said recesses having open tops, as set forth.

20. A machine for making or pressing bricks or other articles, comprising the following instrumentalities: cut-off slides L L′, measuring-boxes $m^3$ $m^4$, plungers K K, platen I, wiper N, and receiving-table O, said plungers being operated by toggles which open against a shaft, E, connected with said platen, and said table rising to receive the contents of the molds, and descending therewith, and having an endless apron moved intermittently forward, substantially as and for the purpose set forth.

21. The sliding diaphragm M, for varying the sizes or areas of the measuring-boxes, as set forth.

In testimony that I claim the foregoing I have hereunto set my hand this 30th day of October, 1876.

JOHN K. CALDWELL.

Witnesses:
M. DANL. CONNOLLY,
CHAS. F. VAN HORN.